United States Patent [19]

Siekkinen et al.

[11] Patent Number: 5,721,374
[45] Date of Patent: Feb. 24, 1998

[54] METHOD OF DETECTING LOW TIRE PRESSURE BY COMPARING WHEEL SPEEDS

[75] Inventors: James Werstler Siekkinen, Carmel, Ind.; Roger Alan Jendrusina, Milford, Mich.

[73] Assignee: Delco Electronics Corporation, Kokomo, Ind.

[21] Appl. No.: 699,321

[22] Filed: Aug. 19, 1996

[51] Int. Cl.⁶ .................................................. B60C 23/02
[52] U.S. Cl. ................................... 73/146.2; 340/442
[58] Field of Search ........................... 73/146, 146.2, 73/146.3, 146.5; 340/442, 440

[56] References Cited

U.S. PATENT DOCUMENTS

| | | | |
|---|---|---|---|
| 3,581,277 | 5/1971 | Beatty, Jr. et al. | 340/58 |
| 3,613,075 | 10/1971 | Griffiths et al. | 340/58 |
| 3,691,524 | 9/1972 | Frost et al. | 340/58 |
| 4,167,699 | 9/1979 | Baker | 324/171 |
| 4,224,597 | 9/1980 | DiCecio | 340/444 |
| 4,355,298 | 10/1982 | Jessup | 340/58 |
| 4,414,548 | 11/1983 | Carpenter et al. | 343/8 |
| 4,777,611 | 10/1988 | Tashiro et al. | 364/565 |
| 4,803,646 | 2/1989 | Burke et al. | 364/561 |
| 4,876,528 | 10/1989 | Walker et al. | 340/442 |
| 5,192,929 | 3/1993 | Walker et al. | 340/444 |
| 5,218,862 | 6/1993 | Hurrell et al. | 73/146.5 |
| 5,228,337 | 7/1993 | Sharpe et al. | 73/146.5 |
| 5,231,597 | 7/1993 | Komatsu | 364/561 |
| 5,248,957 | 9/1993 | Walker et al. | 340/444 |
| 5,307,293 | 4/1994 | Sakai | 364/565 |
| 5,343,741 | 9/1994 | Nishihara et al. | 73/146.2 |
| 5,345,217 | 9/1994 | Prottey | 340/442 |
| 5,442,331 | 8/1995 | Kishimoto et al. | 340/444 |
| 5,483,220 | 1/1996 | Kushimoto et al. | 340/444 |
| 5,524,482 | 6/1996 | Kushimoto et al. | 73/146.3 |
| 5,569,848 | 10/1996 | Sharp | 73/146.2 |
| 5,578,984 | 11/1996 | Nakajima | 340/444 |
| 5,589,816 | 12/1996 | Jones | 340/444 |

FOREIGN PATENT DOCUMENTS

| | | | |
|---|---|---|---|
| 1287901 | 8/1991 | Canada | 340/145.1 |
| 0 564 285 A1 | 4/1992 | European Pat. Off. | |

OTHER PUBLICATIONS

Research Disclosure—Oct. 1993/643 RD# 35403 Title: Method of Detecting Low Tire Pressure by Comparing Tire Speeds. Disclosed Anonymously.

"Method of Detecting Low Tire Pressure by Comparing Tire Speeds," Anonymously, Research Disclosure, Sep. 1993.

*Primary Examiner*—Elizabeth L. Dougherty
*Assistant Examiner*—Paul D. Amrozowicz
*Attorney, Agent, or Firm*—Mark A. Navarre

[57] ABSTRACT

Relative speeds of wheels are measured in different speed ranges when tires are properly inflated to learn offsets due to parameters not related to pressure. The offsets are used during leak monitoring to detect a wheel speed pattern which is abnormal due to pressure drops. During learning periods, monitoring for large pressure drops only is permitted using preliminary offset values. When learning is complete in a given speed range high sensitivity monitoring is invoked. Special sensitivity of large pressure drops shortly after vehicle start up allows a brief period of flat detection. A plurality of leak events for a given wheel are accumulated to signal a warning, with large pressure drops accumulating faster than small drops for progressive sensitivity and greater robustness.

8 Claims, 5 Drawing Sheets

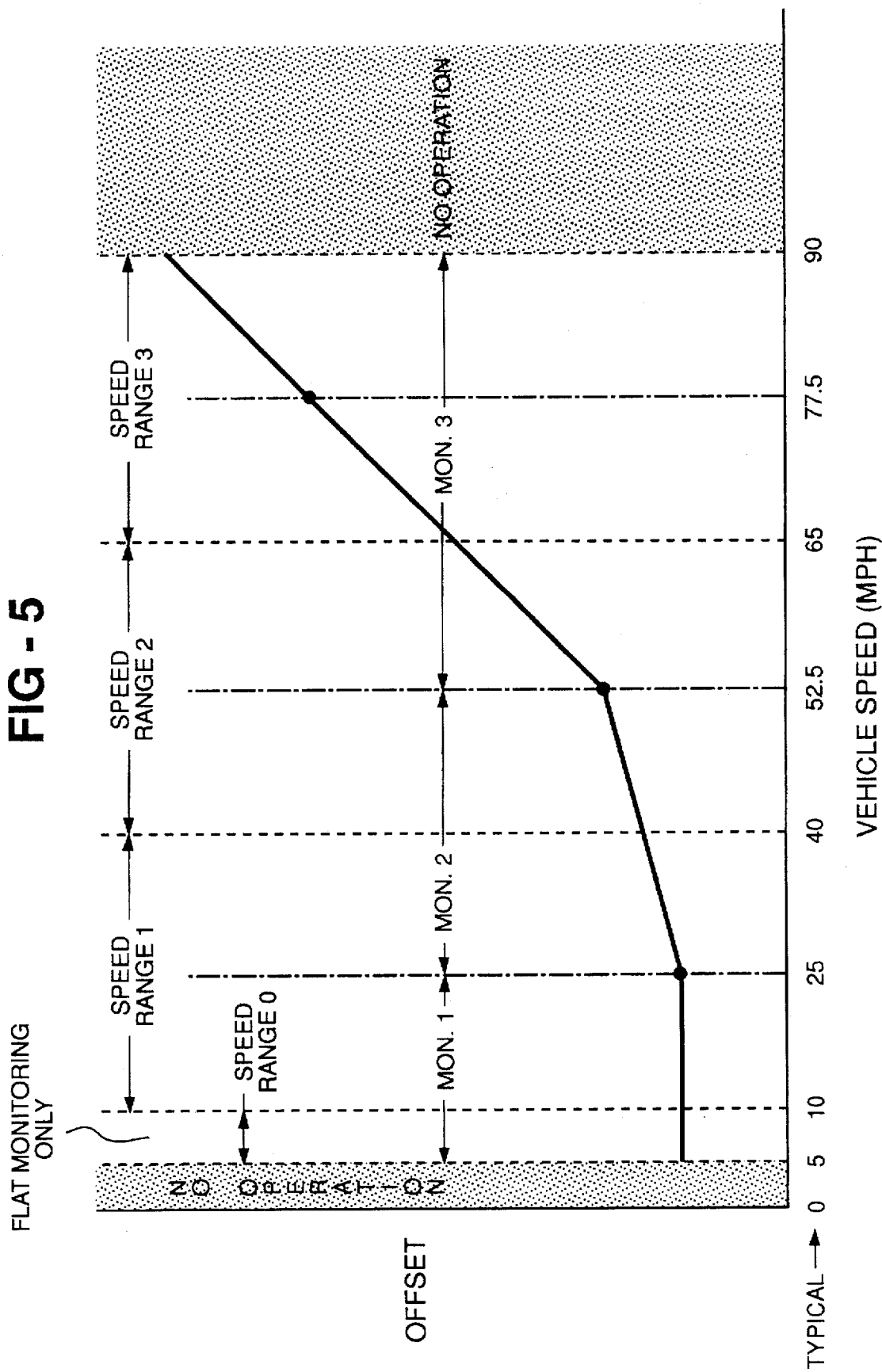

METHOD OF DETECTING LOW TIRE PRESSURE BY COMPARING WHEEL SPEEDS

FIELD OF THE INVENTION

This invention relates to detecting low tire pressure and particularly to a robust method of detecting low tire pressure on the basis of differential wheel speeds.

BACKGROUND OF THE INVENTION

It has long been desired to detect low tire pressure during vehicle operation so that the operator can obtain tire maintenance before a dangerous condition develops. Many schemes of low pressure detection have taken the form of a pressure sensor in each tire and some sort of communication device associated with each sensor to signal tire condition to the vehicle operator. The communication devices have used slip rings, audible signals, magnetic fields and radio signals to bridge the gap between the rotating wheel and the vehicle body. It has also been attempted to sense the shape or tire bulge associated with low pressure.

Another proposed form of low pressure detection has been to measure wheel speeds and compare them to sense a change attributable to decreasing pressure. This approach is attractive in the case of vehicles equipped with anti-lock brakes since the wheel speeds are already measured for that system and it is then a matter of interpretation of wheel speeds to recognize a low pressure condition. In general the rolling radius of the tire decreases at low pressure and thus spins slightly faster than the same tire at normal pressure. The obstacles to detecting low pressure on the basis of such speed difference include other parameters which affect tire speed difference such as the tire behavior in different speed ranges, different behavior of different brands of tires, the effect of different road surfaces, and vehicle turns and acceleration, for example. Nonetheless, specific proposals to detect low pressure from wheel speed behavior have been advanced. Often they require an exorbitant amount of calculation to derive a driver alert signal, they generate an unacceptable number of false alarms, and/or they do not meet basic requirements of a commercially viable, fully functional system.

A commercially useful system must meet the following requirements: 1) The system must be absolutely simple to use, i.e. "Press the button whenever tires are serviced". No other driver interaction can be required. 2) The system software must fit in a typical anti-lock brake system (ABS) controller without requiring any appreciable increase to memory or processor requirements. Currently most new vehicles are ABS equipped and it is reasonable to expect the inflation monitoring function to reside in the ABS controller and to do so without expensive additions to ABS memory or processor. 3) Any useful inflation monitoring system has to be able to easily adapt to changes of the vehicle suspension, configuration and tires over the entire life of the vehicle. The previously proposed systems have failed to meet one or more of these three tests.

SUMMARY OF THE INVENTION

It is therefore an object of the invention to detect abnormal tire pressure within the limitations of a standard ABS controller and with minimal operator interaction. A further object of the invention is to assure robustness so that low pressure detection is accurately performed with a minimum of false alarms even with changing suspension or tire configuration over the life of the vehicle.

It has already been proposed to measure speed differences or "deltas" between the front tires and between the rear tires and to calculate a difference delta as the difference between front and rear deltas. The deltas are normalized for speed and an offset is calculated to effectively "zero" each corrected delta when the tire pressures are believed to be correct. Then subsequent low tire pressure of any one tire will cause a unique pattern of deviation of corrected deltas from zero.

This method is extended by 1) a unique learning algorithm for determining the offsets after tires have been serviced and the reset button has been pressed, 2) permitting tire monitoring during the learning time with the sensitivity increased as the more accurate offsets are determined, 3) progressive sensitivity of detection enabling large pressure aberrations to be detected quickly while more time is devoted to analyzing small pressure differences, 4) partitioning the vehicle speed into ranges and developing different offsets for each range to accommodate variations of tire behavior with speed, 5) using parameters available from the ABS system, and 6) detection of a flat tire just after vehicle startup.

BRIEF DESCRIPTION OF THE DRAWINGS

The above and other advantages of the invention will become more apparent from the following description taken in conjunction with the accompanying drawings wherein like references refer to like parts and wherein:

FIG. 5 is a graph depicting measured offsets for various speed ranges.

DESCRIPTION OF THE INVENTION

Figure 1:
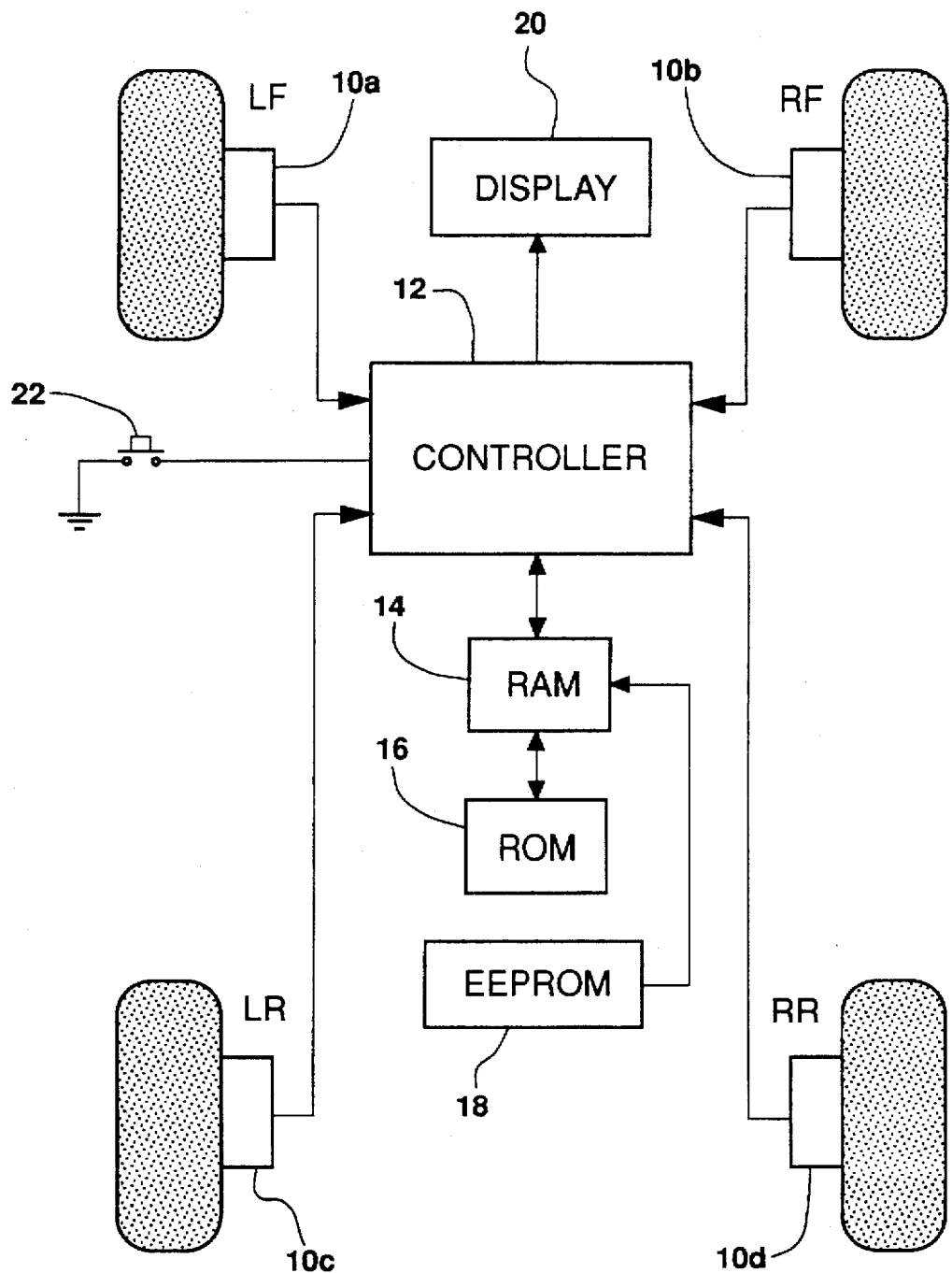
FIG. 1 is a diagram of wheel speed detection and inflation monitoring hardware used in carrying out the method of the invention.

Apparatus for monitoring tire inflation as well as for anti-lock brake control is shown in FIG. 1. Conventional speed sensors 10a, 10b, 10c and 10d are located at the wheels of a conventional automotive vehicle, and provide the speed signals LF, RF, LR and RR for the respective four wheels to an electronic controller 12 such as a Motorola MC68HC11 single chip microcomputer. The wheel information is stored in conventional random access memory 14. At times during operation of the controller program instructions and data are transferred from the conventional read only memory 16 to the random access memory 14 for ready access by the controller 12. For long term storage of parameters developed by the controller 12, an EEPROM 18 is also used as part of the memory. A display or alarm 20 coupled to the controller is used to send a warning to the vehicle operator when low pressure is detected in a tire, and the affected tire is identified. A reset button 22 or switch manually depressed by the operator after the tires are serviced signals the controller to learn the speed pattern of the tires.

The wheel speed information is used by the controller 12 to control brakes via an ABS actuator, not shown, and is also used by the same controller to monitor the tire inflation. When the operator pushes the reset button 22 after the tires are serviced, the controller first determines whether reliable information for inflation monitoring is available, and when it is, the controller learns the pattern of normal wheel speeds for the tires then on the vehicle, then detects any low tire pressure via an aberrant pattern, and triggers the display 20.

A method of detecting low tire pressure by comparing tire speeds has already been proposed as follows: On a vehicle, a tire having an air pressure value that is lower than a nominal or correct pressure will spin slightly faster than the other three properly inflated tires. The first step in detecting this speed difference is to generate the three deltas defined below:

FRONT DELTA = $LF - RF$
REAR DELTA = $LR - RR$
DIFFERENCE DELTA = $(LF - LR) - (RF - RR)$ where LF is left front tire speed RF is right front tire speed LR is left rear tire speed, and RR is right rear tire speed.

The DIFFERENCE DELTA may also be expressed as the FRONT DELTA-REAR DELTA, and compensates for the change in relative tire speeds caused by varying torque and different road surfaced coefficients of friction. The three DELTAs are then normalized with respect to the average speed of four tires:

Normalized DELTA=(DELTA)/(Tire speed average).

Because even properly inflated tires travel at slightly different relative speeds, a calibration is performed when the tires are known to be properly inflated. The calibration process stores the values of the three normalized DELTAs as offsets.

Subsequently, to monitor tire inflation, the offsets are subtracted from newly calculated normalized DELTAs to form corrected DELTAs in the following form:

Corrected DELTA=Normalized DELTA-Offset.

The three Corrected DELTAs are then filtered using a single-pole software filter to form three Filtered DELTAs.

The table below shows the Filtered DELTA values that occur when a given tire is low. For example, a low left front tire will cause FRONT DELTA and DIFF. DELTA to have a value greater than zero, while REAR DELTA will be close to zero in value. In practice a threshold value is used for evaluating the DELTA values. Thus if the FRONT DELTA and DIFF. DELTA exceed a particular threshold and REAR DELTA remains close to zero, it can be said with confidence that the left front tire is low. Similar patterns exist for the other three tires. To help prevent false alarms, tire speeds during turns and over rough roads are ignored.

| TIRE STATE | FILTERED DELTAS | | |
|---|---|---|---|
| | FRONT | REAR | DIFF |
| LF low | >0 | =0 | >0 |
| RF low | <0 | =0 | <0 |
| LR low | =0 | >0 | <0 |
| RR low | =0 | <0 | >0 |

Figure 2:
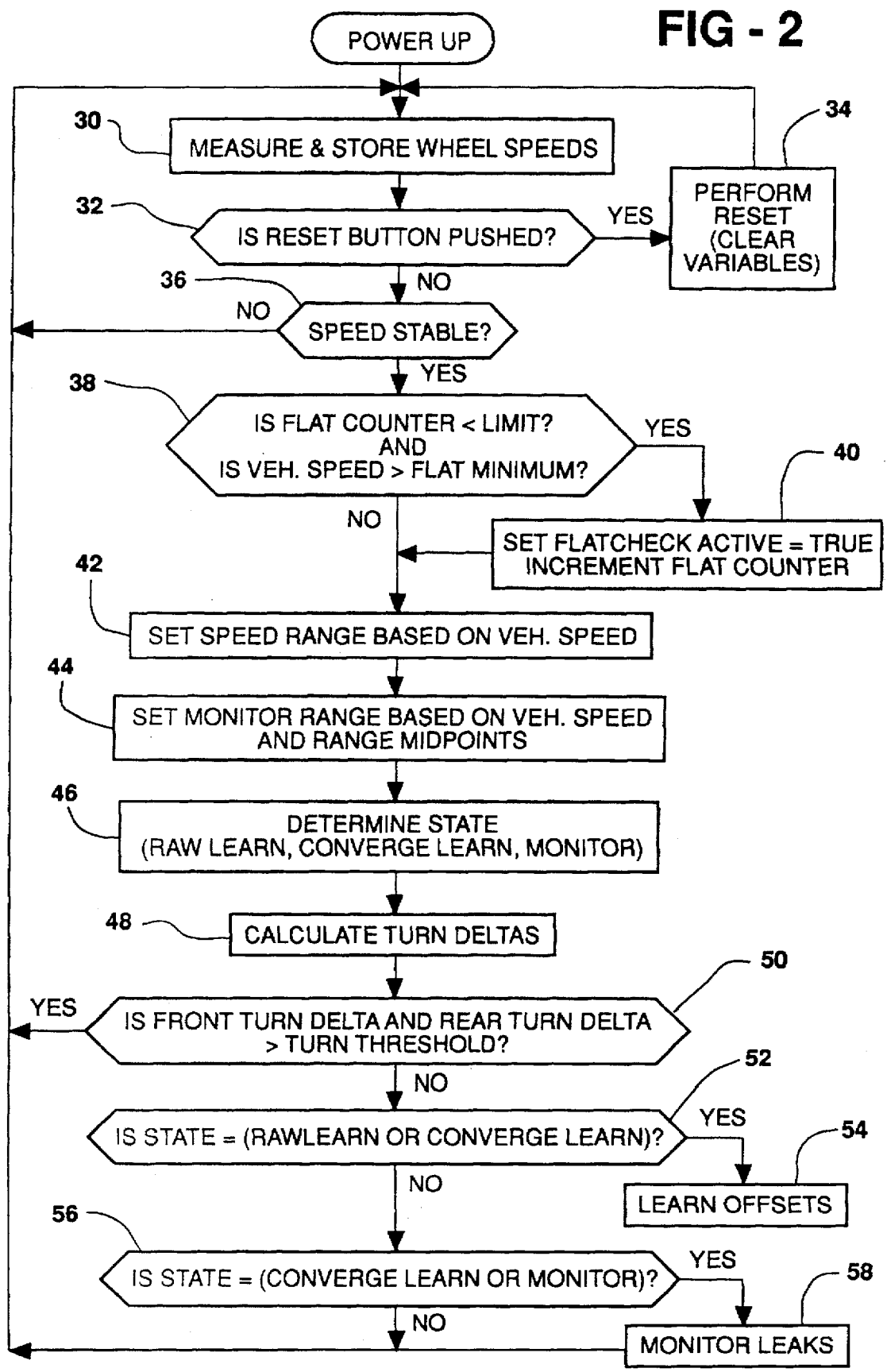
FIGS. 2-4 are flow charts representing algorithms for monitoring tire inflation according to the invention.
Figure 3:
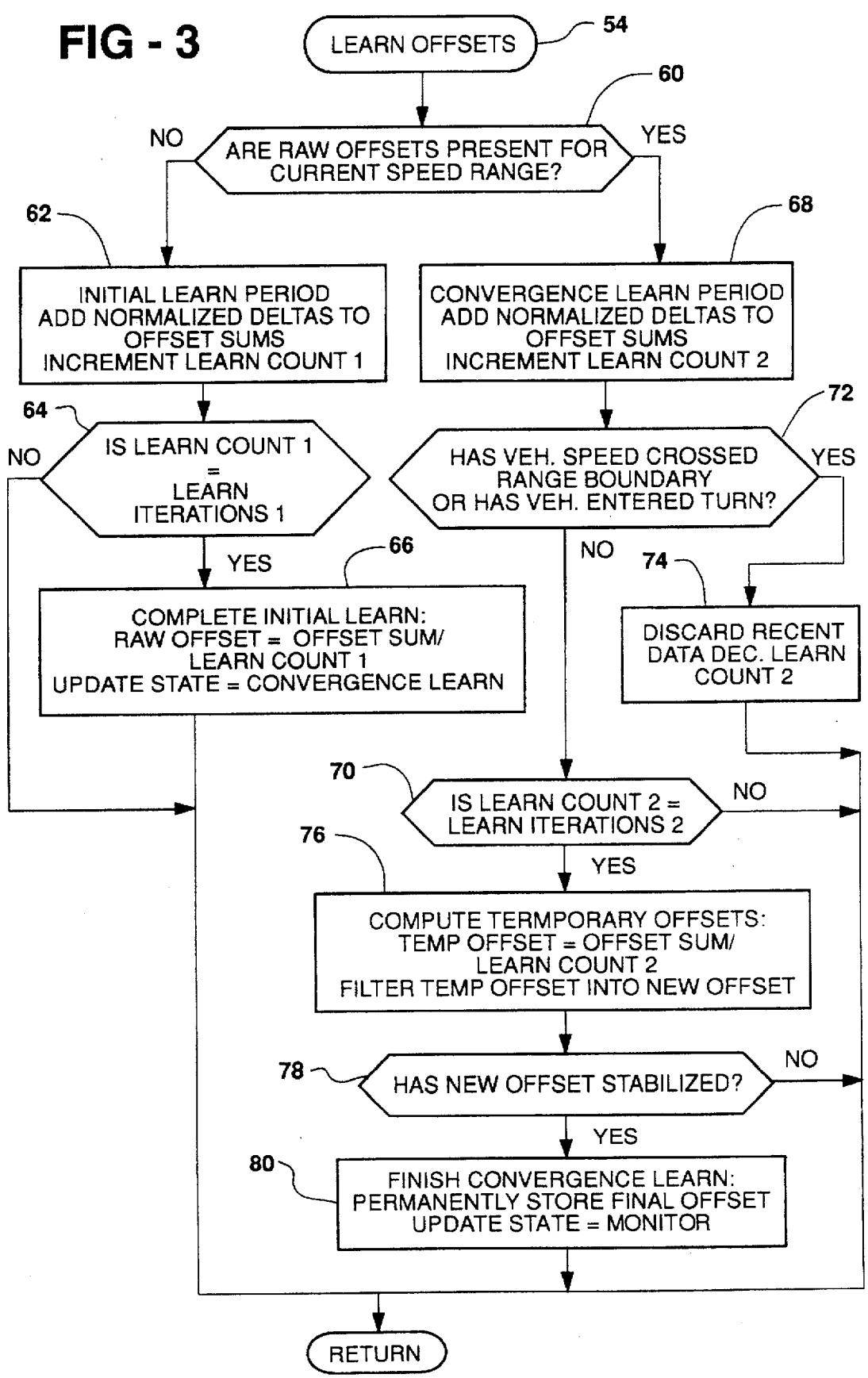
Figure 4:
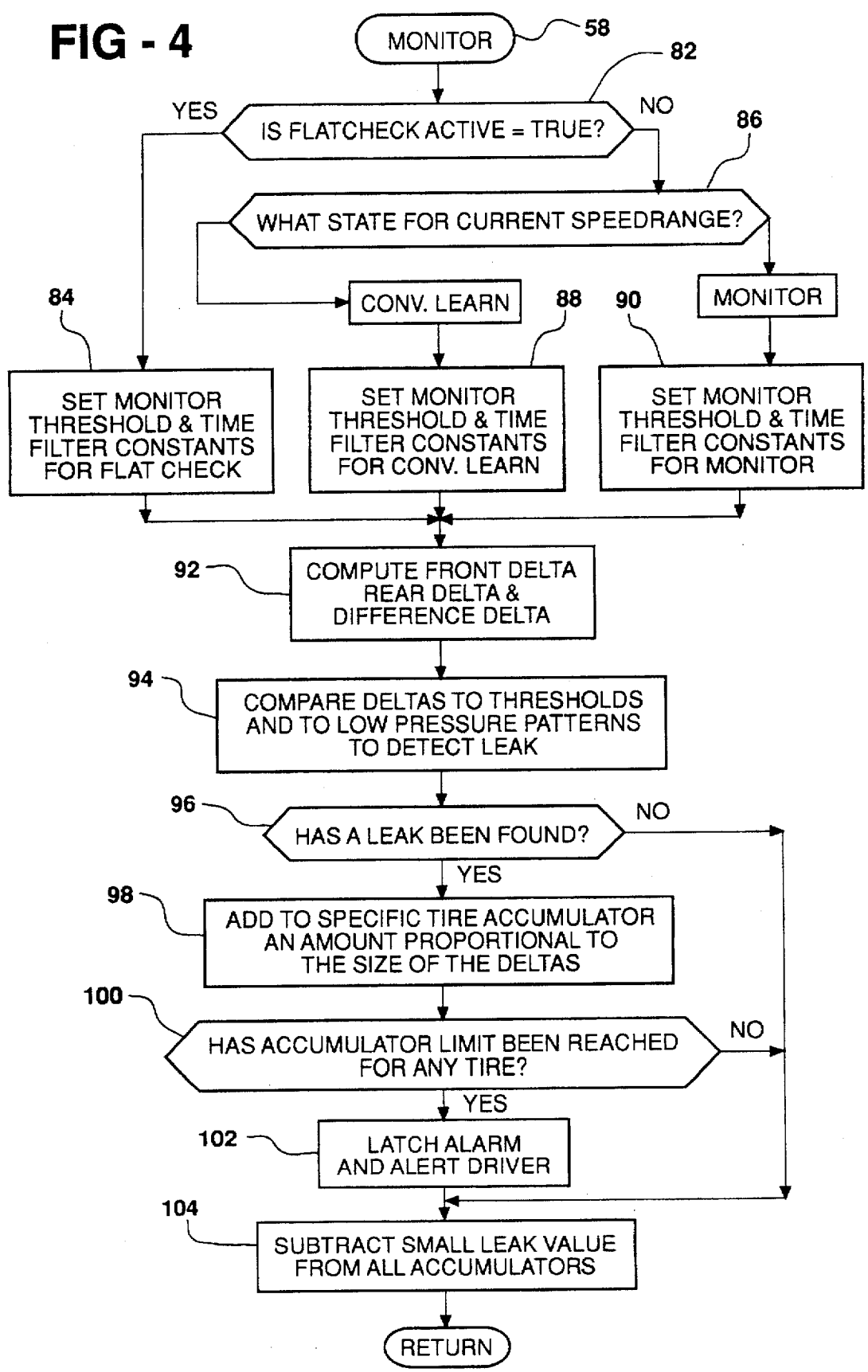

The program used by the controller is generally represented by the flow charts of FIGS. 2–4 wherein the functional description of each block in the charts is accompanied by a number in angle brackets <nn> which corresponds to the reference number of the block. The program is repeated every 32 msec, for example. Referring to FIG. 2, when the ignition switch is closed (Power Up) the wheel speeds are measured and stored, and ABS calculations and operations are performed <30>. If the reset button 22 is pushed <32> the previously determined parameters are cleared <34> and the parameters must then be learned. The reset button should be pressed whenever tires are serviced and properly inflated. This reset is important whenever the tires are rotated or a tire is replaced in order to learn the new speed pattern for normal operation. When the reset is not pushed, the controller determine whether the speed is stable <36>. If any wheel or the vehicle is accelerating beyond a limit value or wheel spin-ups are occurring (an ABS function), the speed is deemed not stable and the program returns to speed measurement until stable conditions exist.

A Flatcheck routine looks for a flat tire in the first few seconds when the ignition has been turned on after the vehicle has been idle. If a Flat Counter is below a limit value and the vehicle speed is above a minimum <38>, a Flatcheck Flag is set and the Flat Counter is incremented <40>. The conditions of step 38 limit Flatcheck operation to a short time (a few program loops) after the vehicle is started but requires a minimum speed, say, 5 mph, so that reliable data can be obtained. This Flatcheck Flag will sensitize the monitor routine (FIG. 4) to look for large pressure drops during this limited period. This feature can detect a flat tire before the vehicle has run far enough or fast enough to damage the tire or the wheel rim.

The next step is to set a speed range based on vehicle speed <42>. Because tires of different brands behave differently at different speeds, the whole vehicle speed range is partitioned into several small ranges to allow a measurement of normal speed pattern in each range. An illustration of such speed partitioning is given in FIG. 5, using one of many possible sets of vehicle speed values. No operation is permitted below 5 mph since the speed data is not reliable. Speed range 0, between 5 and 10 mph is the usual area of Flatcheck operation and is reserved for that purpose. Speed Ranges 1, 2 and 3 are assigned to 10–40 mph, 40–65 mph, and 65–90 mph, respectively. Offsets are independently calculated for each speed range and assigned to specific mid-range speeds. Then during monitoring, it may be assumed that the offset for a given range is good for any speed in that range, and this assumption is realistic. Another practical option is to interpolate between mid-range offset values according to the actual speed to gain increased accuracy. When this option is employed, monitor ranges are established. As shown in FIG. 5, Monitor Ranges 1, 2 and 3 cover the ranges 5–25 mph, 25–52.5 mph and 52.5–90 mph, respectively. Monitor Range 1 is assumed to have a constant offset as measured for Speed Range 1. The other monitor ranges have variable offsets determined from measured points by interpolation. Referring again to FIG. 2, the Monitor Range is set according to the vehicle speed <44>.

Then the state of learning is determined <46> for that particular speed range. Initially, at the time of reset the learn routine enters a Raw Learn state to collect data for several minutes in each speed range, and no monitoring is permitted due to insufficient offset information. When the Raw Learn state is completed, a Raw Offset value is determined and a Converge Learn state is entered. There additional learning refines the Raw Offset to obtain a series of ever improving Enhanced Offsets until a Final Offset is attained and that is permanently recorded. During the Converge Learn state the inflation monitoring is permitted for that speed range based on the Raw Offsets. A Monitor state is entered when the Final Offset is determined for that Speed Range and of course the Final Offset is used for monitoring.

After determining the state, Turn DELTAs are calculated <48> and it is determined whether both front and rear Turn DELTAs exceed a Turn Threshold <50>. Turn DELTAs are calculated in the same way as other DELTAs except that a substantially smaller time constant is used for filtering. If they exceed the threshold, the routine returns to measuring wheel speed and the data collected during the turn is dumped. If no turn is indicated, and the state is in either Raw Learn or Converge Learn <52>, the Learn routine is entered <54> for further improving the Offset value. Then if the state is either Converge Learn or Monitor <56>, the Monitor routine is entered <58> for the determination of low tire pressure and the routine returns to the beginning.

Referring to FIG. 3, the Learn routine 54 looks for the presence of Raw Offsets in the current Speed Range <60>. If they are not established the program is in the initial learn period where normalized DELTAs are summed and a Learn Count1 is incremented <62>. When the Learn Count1 reaches a limit Learn Iterations1 (about 12,000 iterations) <64>, a Raw Offset is calculated by dividing the offset sum by the Learn Count1, and the state is updated to Convergence Learn to complete the initial learn period for that speed range <66>.

Next, the Raw Offsets will be present at step 60. Then the Convergence Learn period starts, normalized DELTAs are added to the Raw Offsets and Learn Count2 is incremented <68>. This may continue for a few thousand iterations until Learn Iterations2 is reached <70>. If it is determined in the meantime that the vehicle speed has crossed a range boundary or the vehicle has entered a turn <72>, the most recent data for a few second is discarded and the Learn Counter is appropriately decremented <74>. This will avoid using data which clearly is not relevant to the Offsets at mid-range. After Learn Count2 is reached, Temporary Offsets are calculated by dividing the Offset Sum by Learn Count2, and thereafter time filtering the Temporary Offset into a New Offset to gradually enhance the offset value <76>. When the Offset stabilizes, i.e. no longer changes with new data <78>, the Offset is permanently stored as a Final Offset for that speed range and the state is set to Monitor to finish the Convergence Learn routine <80>. It is understood that as used here, Offset comprises three offset terms, one for each DELTA.

The time filtering used herein comprises adding to the last DELTA a small portion of the difference of the newest DELTA and the last DELTA, or DELTA=LastDELTA+(NewDELTA−LastDELTA)*(Filter Constant). The Filter Constant is selected to gradually update the DELTA with the values of the new data. This time filtering is used not only in the Learn routine to establish the Final Offset but also in the monitor routine to filter the corrected DELTAs to form the Filtered DELTAs. When operating in the Flatcheck monitoring mode a large Filter Constant is used for less filtering of the data to obtain fast response to large pressure drops.

Referring to FIG. 4, the Monitor routine 58 first checks the Flatcheck Flag <82>. If it is present the Monitor Threshold and the Filter Constant are set to values suitable for Flatcheck <84>. The monitor threshold is set to a high value so that only large pressure drops will indicate an aberration in the DELTA pattern. If the Flatcheck Flag is not set, the state for the current speed range is determined <86>. If the state is Convergence Learn, the Monitor Threshold and Filter Constants are set accordingly <88> and if the state is Monitor suitable Monitor Threshold and Filter Constants are set for that state <90>. These parameters are chosen to afford lower sensitivity for the Convergence Learn condition since the Offsets are still being developed and are thus less accurate than for the Monitor state. Still, the leak monitoring during the Convergence Learn period affords low pressure detection for large pressure drops. The sensitivity for each state is set, for example, to detect a pressure drop of 12–16 psi during Convergence Learn and a drop of 8–10 psi for the Monitor state.

The remainder of the Monitor routine is substantially the same for any state. Front and Rear DELTAs are computed <92> by calculating and normalizing speed differences, interpolating offsets from measured offsets and subtracting from the normalized differences to obtain corrected DELTAs, and then time filtering. For the Convergence Learn state there is a choice of using the Raw Offsets or the Enhanced Offsets. Usually the Enhanced Offsets are more accurate but it is preferred to use the Raw Offsets in case tire deflation is occurring during the Convergence period. The interpolating step requires that for Monitor Ranges 2 and 3 offsets have been determined for two speed ranges. If not, the Monitor mode will terminate. (If Speed Ranges are used for monitoring instead of the Monitor Ranges, and interpolation is not used, this anomaly will not occur). The difference of the filtered Front and Rear DELTAs yields the Difference DELTA. The DELTAs are compared to the Monitor Threshold to determine if a low pressure pattern is present as defined in the table given above <94>. If a leak has been found <96> an amount proportional to the size of the calculated DELTAs is added to an accumulator for the affected tire <98>. For example, if the Front and Difference DELTAs are above the threshold and the Rear DELTA is below the threshold, the table reveals that the left front tire is low. The sum of the Front and Difference DELTAs represents the size of the pressure drop and that sum is added to the left front accumulator. This ability to increase the accumulation faster for large pressure drops affords progressive sensitivity. Thus large pressure drops are more quickly recognized whereas small pressure drops are subject to more filtering to ensure that the pressure is indeed low before giving a low pressure warning. When any accumulator reaches a limit value <100> an alarm is latched and the driver is alerted via the display 20 <102>. Finally a small amount is subtracted from each accumulator <104> to nullify, over time, any accumulation which is due merely to an unusual vehicle maneuver rather than to a consistent pattern of low pressure.

It will be recognized that the calculations required by the controller are modest and do not require additions to conventional ABS hardware. The algorithm for learning offsets and leak monitoring permits monitoring while learning is still in process, provided a minimal amount of learning has taken place to obtain raw offsets. Variable sensitivity permits rapid flat detection at the beginning of each vehicle operation, and multiple sensitivity during learning modes allows a lower sensitivity during Convergence Learn state for detection of large pressure drops before the offsets are fully developed and higher sensitivity is permitted in the Monitor state. Additional flexibility is afforded by the progressive sensitivity which gives greater weight to larger pressure drops in accumulating pressure events. The partitioning into speed ranges accommodates various types and mixes of tires which may be experienced over the life of a vehicle by making measurements of offsets in each speed range. The operator has only to push the reset button when tires are serviced and thereafter drive normally without special driving exercises for updating the offsets. The net result is a robust method which avoids false alarms and reliably detects leaks, even early in the learning process, and is especially adapted to find flats after the vehicle has been sitting idle.

The embodiments of the invention in which an exclusive property or privilege is claimed are defined as follows:

1. A method of operation for a vehicle low tire pressure warning system based on tire speed comprising the steps of:

measuring tire speeds and periodically determining a current pattern of relative tire speeds;

determining raw offset values by aggregating the current patterns of relative tire speeds determined during an initial period of operation;

after a given number of said current patterns of relative tire speeds have been aggregated, initiating a convergence period of operation in which said raw offset values are adjusted based on the current pattern of relative tire speeds determined during said convergence period, and low tire pressure is detected when a computed difference between a determined current pattern of relative tire speeds and the adjusted offset values exceeds a first under-inflation threshold amount;

after said adjusted offset values stabilize, storing said adjusted offset values as final offset values, and initiating a monitoring period of operation during which low tire pressure is detected when a computed difference between a determined current pattern of relative tire speeds and the stored final offset values exceeds a second under-inflation threshold amount which is lower than said first under-inflation threshold amount; and issuing a low tire pressure warning based on the detection of low tire pressure.

2. The method of operation as defined in claim 1 including:

establishing a plurality of vehicle speed ranges above a minimum speed; and separately performing the steps of determining raw offset values, initiating a convergence period of operation, storing adjusted offset values as final offset values and initiating a monitoring period of operation in each of said vehicle speed ranges;

whereby unique offset values are determined for each of said vehicle speed ranges.

3. The method of operation as defined in claim 2 wherein:

the initial period of operation for each of said vehicle speed ranges begins when a current pattern of relative tire speeds is first determined while the vehicle is in that speed range.

4. The method of operation as defined in claim 2 wherein detecting low tire pressure includes:

establishing a pattern of relative tire speeds indicative of low tire pressure;

assigning offset values determined for each speed range to a mid-point speed in the respective speed range;

calculating a pattern of corrected relative tire speeds using the assigned offsets; and comparing the calculated pattern to the established pattern.

5. The method of operation as defined in claim 2 wherein detecting low tire pressure includes the steps of:

assigning offset values determined for each speed range to a mid-point speed in the respective speed range;

for current vehicle speed, interpolating between assigned offset values to obtain speed specific offset values; and determining when a computed difference between a determined current pattern of relative tire speeds and said speed specific offset values exceeds a respective under-inflation threshold amount.

6. The method of operation as defined in claim 1 wherein the step of issuing a low tire pressure warning includes the steps of:

accumulating said computed differences for each tire; and issuing a low tire pressure warning when the accumulated differences for any tire reach a limit value.

7. The method of operation as defined in claim 1 including:

accumulating low pressure events for each tire weighted according to the current pattern of relative tire speed less the respective offset values; and issuing a low tire pressure warning when the accumulator total for any tire reaches a limit value, whereby large pressure drops accumulate faster than small pressure drops to achieve progressive sensitivity.

8. The method of operation as defined in claim 1 including the step of detecting a flat tire above a minimum speed within a short time of the beginning of vehicle operation when a computed difference between a determined current pattern of relative tire speeds and a respective offset value exceeds a third under-inflation threshold amount which is higher than said first under-inflation threshold amount.

* * * * *